Patented Mar. 19, 1935

1,994,732

UNITED STATES PATENT OFFICE 1,994,732

ALDOL CONDENSATION PRODUCT AND VULCANIZATION OF CAOUTCHOUC THEREWITH

Lorin B. Sebrell, Cuyahoga Falls, Ohio, assignor to Wingfoot Corporation, Wilmington, Del., a corporation of Delaware No Drawing. Application October 14, 1932,
Serial No. 637,790

19 Claims. (Cl. 18—53)

This invention relates to the vulcanization of rubber and balata, gutta percha, rubber substitutes, etc. It provides among other things a class of accelerators possessing high curing power and wide adaptability in the art. By the practice of the invention, there is obtained a vulcanized rubber product having excellent ageing properties and high tensile strength.

United States Patent Nos. 1,417,970 and 1,467,984 disclose the preparation of accelerators of vulcanization by condensing aldehydes with amines and the further condensing of the reaction product so formed with more of the aldehyde. The present invention distinguishes therefrom in that it relates to the use in rubber of the aldehyde derivatives of condensation products of aldols and amines. It has been found that when employed in rubber these reaction products, in addition to greatly accelerating the rate of vulcanization, also increase the resistance of the product to the effects of heat and ageing.

Chemically, the aldols can to some extent, but not entirely, be likened to the aldehydes. For example, they form condensation products and give the characteristic reactions of the aldehydes with sodium bisulphite and hydroxylamine. In several important respects, however, they differ materially. Among other things, on heating at ordinary pressures, they decompose, losing water to give the corresponding unsaturated aldehydes. This can be shown by the following reaction, acetaldol being used as an example:

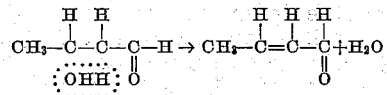

Acetaldol    Crotonaldehyde

Acetaldehyde, as is also true of the other aldehydes, does not show this reaction.

Still other differences are to be found, as hereinafter more fully pointed out. On treating acetaldehyde with aniline, ethylidene aniline is formed. If this product is reacted with hydrocyanic acid, there results the nitrile, a substance which may be decomposed with water to form the acid. The aldol-amine addition products do not react to form the nitriles. Thus they do not exhibit this characteristic property of the aldehydeamines.

It is evident, therefore, that not only are the starting materials different, but their reaction products also are different.

This is confirmed in Richter's Organic Chemistry, volume 2, "Translation from the 11 Edition", page 91, line 9:

"The simple, as well as the polymeric, alkylidene-anilines easily add hydrocyanic acid, with formation of the nitrites of α-anilido-carboxylic acids, also obtained by direct transformation of aniline salts, with aldehydes, and CNK (B. 37, 4073; 39,986, 2796). The aldoloid condensation products, on the other hand, do not add HCN; they behave like di-acid, di-secondary bases; they do add bromine, and must therefore be regarded as probably dianiline derivatives of the olefinglycols, e. g. $CH_3CH(NHC_6H_5)CH:CH(NHC_6H_5)$". Attention is called to the misprint in line 11 which mentions the "nitrites of α-anilido-carboxylic acids". This, of course, should be "nitriles of α-anilido-carboxylic acids", as is brought out later in line 27 in speaking of the hydrocyanic acid addition products of ethylidene aniline as "the α-anilido-propio-nitrile".

The following is a graphical representation:

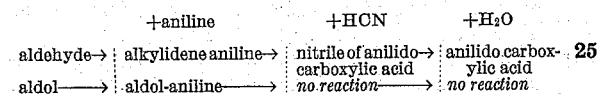

From what has been said above, it is evident that the chemical properties of the aldols are considerably different from those of the aldehydes from which they are formed. However, the physical properties are even more different. Acetaldehyde, for example, is a very fluid, volatile liquid boiling at 20–22 degrees C. and having a pungent, disagreeable odor; acetaldol, a viscous non-volatile liquid boiling at 60–70 degrees C. at 12 mm. pressure. It is free from the offensive odor referred to and decomposes when distilled at ordinary pressures.

In the practice of the present invention, the adol is first reacted with a primary or secondary amine, after which the product is further reacted with an aldehyde. Although it will generally be found desirable to react the materials in molar proportions, it is to be understood that the invention does not require such to be employed. Other ratios such as one mol of aldol to one to three mols of amine to one half to three mols of aldehyde also give rise to accelerators of excellent properties. The reactions may be carried out either in the presence or absence of catalysts such as hydrochloric acid, acetic acid, iodine, etc.

Although acetaldol is employed herein to illustrate the practice of the invention, any other aldol may be employed in its stead. The aldols resulting from the reaction of two mols of aldehyde which have a free hydrogen atom next to the aldehyde group will in general be found to be preferable. Among these are propionic aldol, acetopropionic aldol, isobutyric aldol, isobutyric isovaleric aldol, isovaleric aldol, etc.

Among the amines suitable for the invention are aniline, 1-4-amino meta xylene, ammonia, ethylene diamine, ortho and paratoluidine, benzylamine, meta toluylene diamine, alpha and beta naphthylamines, hydroxyl amine, para phenylene diamine, amino phenol, benzidine, tolidine, diphenylamine, and tetra hydro naphthylamines. Others are allyl amine, butyl amine, ethyl amine, methyl amine, diethyl amine, dimethyl amine, dibutyl amine, isopropyl amine, propylene diamine, and butylene diamine.

The product resulting from the condensation of any of these amines with an aldol may be reacted with an aliphatic or aromatic aldehyde to form products having excellent accelerating properties. Illustrative of the aldehydes are formaldehyde, acetaldehyde, propionaldehyde, nonylaldehyde, butyraldehyde, heptaldehyde octylaldehyde, acrolein, crotonaldehyde, benzylaldehyde, amyl aldehyde, cinnamic aldehyde, valeraldehyde, furfuraldehyde and alpha ethyl beta propyl acrolein. The lower aldehydes such as formaldehyde and acetaldehyde will generally give resinous products easily handled in the various processing steps prior to vulcanization, while those of a more complex nature usually produce materials liquid in form and easily incorporated in rubber.

Exemplary of the preparation of products of the invention is that of the formaldehyde derivative of the condensation product of acetaldol and aniline. In preparing it, molar quantities of acetaldol and aniline are mixed directly in a suitable container. Some heat is evolved during the resulting reaction, but not sufficient to volatilize the ingredients. After the reaction has run its course, the product is heated to and maintained at 100 degrees C. for several hours, after which it is subjected to steam distillation to remove any unreacted aniline. This product is then treated with one half mol. of formaldehyde, giving an accelerator solid in form and easily incorporated in rubber. In place of formaldehyde, acetaldehyde, butyraldehyde or any other aldehyde may of course be employed.

Further illustrative of the preparation of the aldol-amine condensation products, one mol. of acetaldol may be dissolved in 500 cc. of ether and ammonia gas passed through the solution at 0° C. until the same becomes saturated, after which the ether is allowed to evaporate. This product on being reacted with an aldehyde likewise gives an excellent accelerator. In this reaction the ether serves to dissolve the ammonia and aldol, thereby bringing them into more intimate contact. The ether may be regarded as a carrier fluid which makes the amine more readily available for condensation and thereby aids in effecting a complete reaction. Of course any other fluid which will perform such function may be used in place of the ether. Likewise, these carrier fluids will be found desirable in preparing certain other of the adol-amine condensation products such, for example, as the methyl amine-aldol product.

The aldehyde derivatives of aldol-amines may be employed in substantially any of the standard rubber formulæ, the following constituting one which has been found to be particularly valuable.

| | Parts |
|---|---|
| Rubber | 100 |
| Activator | 5 |
| Sulfur | 3 |
| Accelerator | .5 |

Zinc oxide was used as an activator in these tests but litharge or salts of lead or zinc such as the stearate, acetate and bezoate will function in like manner and may be used. The formaldehyde derivative of the condensation product of aldol and aniline when incorporated in the above rubber formula and vulcanized for 45 minutes at 40 pounds steam pressure gave a product which at the ultimate tensile of 160 kgs/cm$^2$ elongated 825% of its original length. It is quite apparent that by this invention a new class of accelerators high in curing value and imparting desirable ageing and tensile properties to the rubber product is provided.

Since the structural formulæ of the products of the invention are known in only a few cases, it has been found necessary to designate the products as derivatives and reaction products. This is made even more desirable by the fact that the products polymerize somewhat on standing and thereby probably undergo so structural changes.

This application is in part a continuation of application Serial No. 412,283, filed December 6, 1929, which in turn is a division of United States Patent 1,754,865.

It will be understood that the details of the invention may be varied within comparatively wide limits without departing from the inventive concept. It is therefore desired to embrace within the scope of the invention such modifications and changes as may be necessary to adapt it to varying conditions and uses. It is intended that the patent shall cover, by suitable expression in the appended claims, whatever features of patentable novelty reside in the invention.

What is claimed is:

1. A vulcanized product formed by the reaction of caoutchouc, a vulcanizing agent, an activator and the product resulting from the reaction of acetaldol with aniline and the further reaction of this material with formaldehyde.

2. A process of treating rubber which comprises subjecting it to vulcanization in the presence of the formaldehyde derivative of the condensation product of acetaldol and aniline.

3. A process of treating rubber which comprises subjecting it to vulcanization in the presence of the formaldehyde derivative of the condensation product of acetaldol and an organic amine.

4. A process of treating rubber which comprises subjecting it to vulcanization in the presence of an aliphatic aldehyde derivative of the condensation product of acetaldol and an amine.

5. A process of treating rubber which comprises subjecting it to vulcanization in the presence of the formaldehyde derivative of the condensation product of an aldol and an amine.

6. A process of treating rubber which comprises subjecting it to vulcanization in the presence of an aliphatic aldehyde derivative of the condensation product of an aldol and an organic amine.

7. A process of treating rubber which comprises subjecting it to vulcanization in the presence of an aldehyde derivative of the condensation product of an aldol and an amine.

8. A rubber product that has been vulcanized in the presence of the formaldehyde derivative of the condensation product of acetaldol and aniline.

9. A rubber product that has been vulcanized in the presence of an aldehyde derivative of the condensation product of acetaldol and aniline.

10. A rubber product that has been vulcanized in the presence of the formaldehyde derivative of the condensation product of acetaldol and an amine.

11. A rubber product that has been vulcanized in the presence of an aldehyde derivative of the condensation product of acetaldol and an amine.

12. A rubber product that has been vulcanized in the presence of an aldehyde derivative of the condensation product of an aldol and an amine.

13. A rubber product that has been vulcanized in the presence of an aliphatic aldehyde derivative of the condensation product of acetaldol and an amine.

14. A rubber product that has been vulcanized in the presence of an aliphatic aldehyde derivative of the condensation product of acetaldol and aniline.

15. A rubber product that has been vulcanized in the presence of the formaldehyde derivative of the condensation product of acetaldol and a primary aromatic amine.

16. A rubber product that has been vulcanized in the presence of an aliphatic aldehyde derivative of the condensation product of acetaldol and a primary aromatic amine.

17. The process of treating rubber which comprises subjecting it to vulcanization in the presence of the formaldehyde derivative of a condensation product of an aldol and a primary aromatic amine.

18. The process of treating rubber which comprises subjecting it to vulcanization in the presence of the formaldehyde derivative of a condensation product of acetaldol and a primary aromatic amine.

19. The process of treating rubber which comprises subjecting it to vulcanization in the presence of the formaldehyde derivative of a condensation product of an aldol and a material selected from the group consisting of organic amines and ammonia.

LORIN B. SEBRELL.